United States Patent [19]

Belenkiy et al.

[11] Patent Number: 5,608,830
[45] Date of Patent: Mar. 4, 1997

[54] ADAPTER ASSEMBLY FOR FIBER OPTIC CONNECTORS

[75] Inventors: Yuriy Belenkiy, Niles; Igor Grois, Northbrook; Irina Gumin, Skokie; Ilya Makhlin, Wheeling; Mark Margolin, Lincolnwood; Michael J. Pescetto, Hanover Park, all of Ill.

[73] Assignee: Molex Corporation, Lisle, Ill.

[21] Appl. No.: 649,958

[22] Filed: May 1, 1996

Related U.S. Application Data

[62] Division of Ser. No. 373,175, Jan. 17, 1995, Pat. No. 5,553,180.

[51] Int. Cl.[6] .................................................. G02B 6/36
[52] U.S. Cl. .................................................. 385/78; 385/59
[58] Field of Search .............................. 385/53, 55, 56, 385/58, 59, 60, 70, 71, 76, 77, 78, 89

[56] References Cited

U.S. PATENT DOCUMENTS

| | | | |
|---|---|---|---|
| 4,759,599 | 7/1988 | Yamaguchi et al. | 385/59 |
| 5,293,581 | 5/1994 | DiMarco | 385/76 |
| 5,315,679 | 5/1994 | Baldwin et al. | 385/76 |
| 5,325,454 | 6/1994 | Rittle et al. | 385/89 |
| 5,386,487 | 1/1995 | Briggs et al. | 385/78 |

FOREIGN PATENT DOCUMENTS

| | | | |
|---|---|---|---|
| 62-36613 | 2/1987 | Japan | 385/59 |
| 62-111215 | 5/1987 | Japan | 385/59 |

*Primary Examiner*—John Ngo
*Attorney, Agent, or Firm*—A. A. Tirva

[57] ABSTRACT

An adapter assembly is provided for holding two individual fiber optic connectors in generally parallel side-by-side alignment. The assembly includes a body having a pair of holding portions adapted for holding the fiber optic connectors in a substantially side-by-side relationship. A separate spring is mounted on the body and is adapted for cooperating with the body to bias the fiber optic connectors to a substantially parallel relationship.

4 Claims, 3 Drawing Sheets

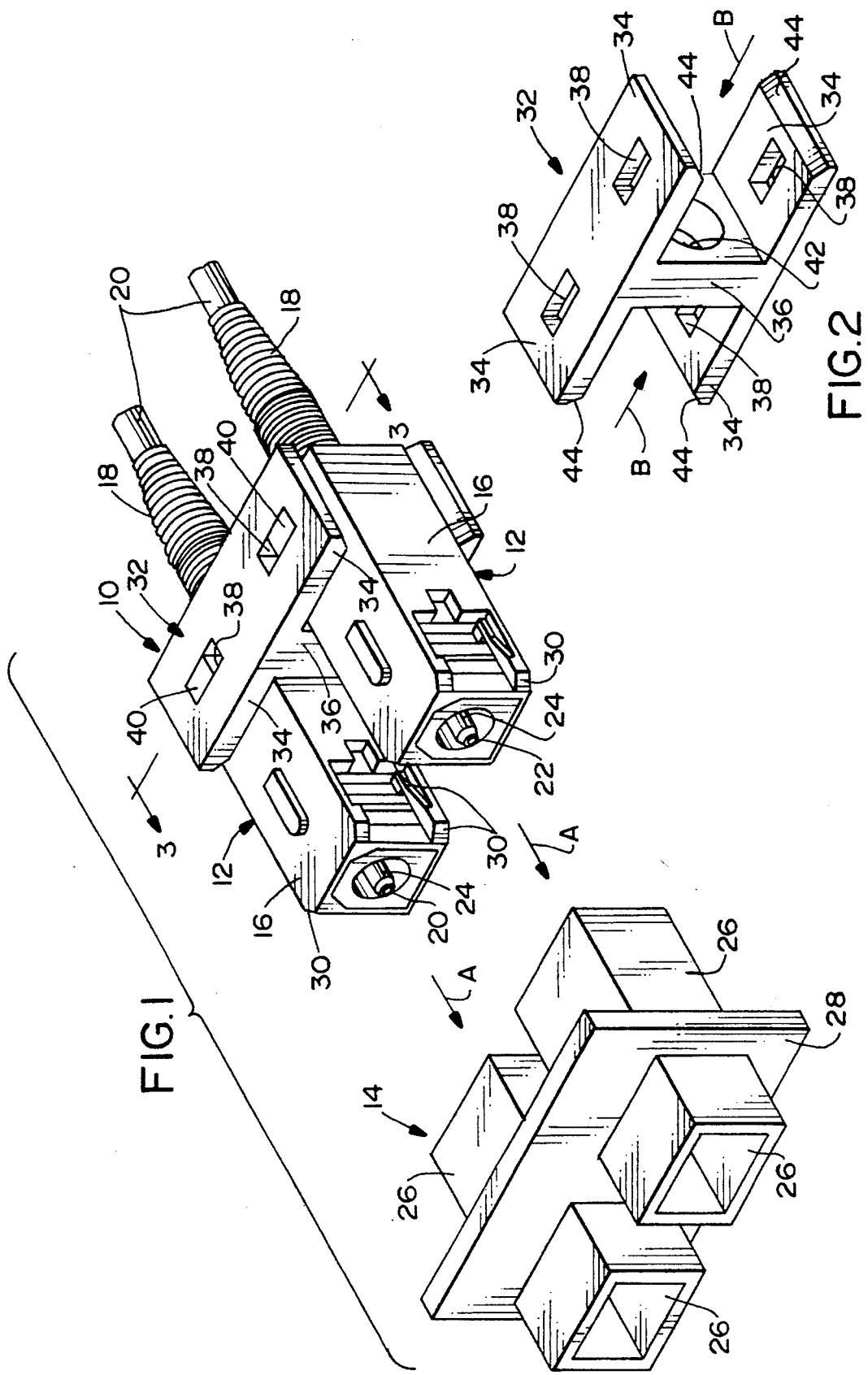

ADAPTER ASSEMBLY FOR FIBER OPTIC CONNECTORS

This is a divisional of application(s) Ser. No. 08/373,175 filed on Jan. 17, 1995 U.S. Pat. No. 5,554,180.

FIELD OF THE INVENTION

This invention generally relates to the art of fiber optic connector assemblies and, particularly, to an adapter assembly for holding a pair of individual fiber optic connectors.

BACKGROUND OF THE INVENTION

Fiber optic devices use single or multiple strands of fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together. Additionally, several transmission lines can be arranged in parallel for the simultaneous transmission of information along each of the separate lines.

Originally, fiber optic systems utilized simplex interconnection systems with single connector plugs terminating single fiber optic cables. In a simplex system, either transmission or reception of information can take place at one time. Consequently, simplex systems are limited in the amount of information that they can transmit and receive during a given period of time.

To increase the amount of information that can be communicated over fiber optic systems, multi-channel systems were developed. Such multi-channel systems include, for example, duplex connector plugs and cables which are capable of simultaneous transmission and reception. Thus, using a duplex system enables information to be transmitted at a much higher rate.

Despite the advantages, multi-channel fiber optic systems are relatively new, and many simplex systems and parts are already in use, for example, ST and SC type connectors. Consequently, simplex parts are readily available and less expensive because there is an existent inventory. Moreover, it would be difficult if not cost prohibitive to retrofit existing simplex systems with dedicated duplex or other multi-channel parts. Consequently, a need exists for an interconnection system which is compatible with both simplex and duplex parts and which permits the interconnection of simplex parts in a duplex configuration to provide duplex data transmission. Several designs have been proposed to address this problem. Typically, they involve an adapter structure which clamps on two individual connector housings to hold the two connectors in a side-by-side relationship forming a duplex connector.

The present invention is directed to providing an improved, more reliable adapter structure or assembly for holding a pair of connectors in a side-by-side relationship and ensuring that the connectors are maintained in a generally parallel relationship and alignment.

SUMMARY OF THE INVENTION

An object, therefore, of the invention is to provide a new and improved adapter assembly for holding two individual fiber optic connectors in generally parallel side-by-side alignment.

In the exemplary embodiments of the invention, the adapter assembly includes a body having a pair of holding portions adapted for holding the fiber optic connectors in a substantially side-by-side relationship. A separate spring means is mounted on the body and is adapted for cooperating with the body to bias the fiber optic connectors to a substantially parallel relationship.

As disclosed herein, the body is generally H-shaped with two opposing pairs of leg portions defining the pair of holding portions. The pairs of leg portions are joined by a bridge portion, and the spring means is mounted on the bridge portion.

In one embodiment of the invention, the spring means comprises a coil spring mounted in a through hole in the bridge portion of the H-shaped body. Opposite ends of the coil spring are maintained in opposing biasing engagement with the fiber optic connectors.

In another embodiment of the invention, the spring means comprises a leaf spring mounted intermediate its ends to the body near the bridge portion thereof. Opposite ends of the leaf spring are maintained in biasing engagement with the fiber optic connectors.

In both embodiments of the invention, lost motion means are provided to mount the fiber optic connectors to the holding portions of the body to provide floating motion between the connectors and the body.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of an adapter assembly according to the invention and holding two individual fiber optic connectors, in conjunction with a duplex receptacle for the connectors;

FIG. 2 is a perspective view of the body of the adapter assembly;

DETAILED DESCRIPTION OF THE PREFERRED EMBODIMENTS

Figure 3:
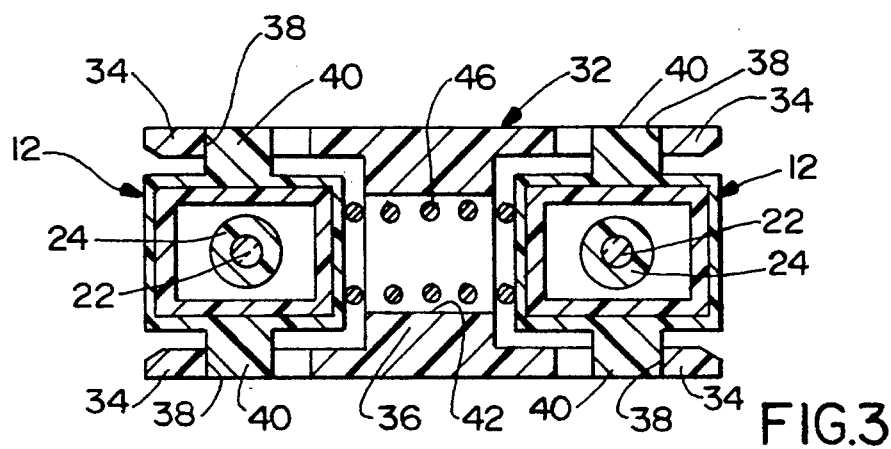
FIG. 3 is a vertical section taken generally along line 3—3 of FIG. 1.

Referring to the drawings in greater detail, FIGS. 1–4 show a first embodiment of the invention, and FIGS. 5–8 show a second embodiment of the invention. Although both embodiments use a common concept of providing an adapter assembly with a body and a separate spring means, the embodiment of FIGS. 1–4 will be described first, followed by a description of the embodiment of FIGS. 5–8.

Referring first to FIG. 1, the invention is incorporated in an adapter assembly, generally designated 10, designed for holding two individual fiber optic connectors, generally designated 12, in generally parallel side-by-side alignment so that the connectors can be easily inserted into a duplex receptacle, generally designated 14, or other duplex connecting device. Each fiber optic connector 12 includes a generally rectangular housing 16 with a boot 18 projecting from the rear thereof for embracing a fiber optic cable 20. The cable 20 contains an optical fiber 22 which, as explained in the "Background" above, includes an inner circular glass core surrounded by circumferential cladding. The fibers 22 are shown in FIG. 1 centered within ferrules 24 of the fiber optic connectors.

As stated above, adapter assembly 10 is designed for holding connectors 12 in generally parallel side-by-side alignment for easy insertion of the connectors into duplex receptacle 14. The receptacle has a pair of rectangular sockets 26 on opposite sides of a flange 28. Connectors 12 are inserted into the sockets on the right-hand side of flange 28 in the direction of arrows "A". The front edges or corners of the connector housings 16 are chamfered, as at 30, to facilitate guiding the connectors into the sockets of duplex receptacle 14. A second pair of connectors or other complementary connecting devices are inserted into the left-hand sockets 26 of duplex receptacle 14 for mating with connectors 12. When mated, light is transmitted along fibers 22 to and from the connectors and the mating connecting devices.

Figure 4:
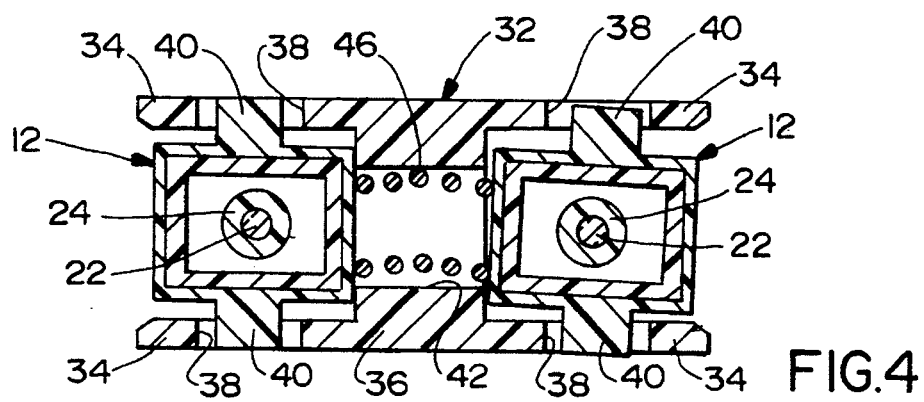
FIG. 4 is a view similar to that of FIG. 3, but showing one of the fiber optic connectors out of alignment.

Referring to FIG. 2 in conjunction with FIG. 1, adapter assembly 10 includes a body, generally designated 32, which has a generally H-shape as seen best in FIG. 2. Body 32 is a unitary structure which can be integrally molded of substantially rigid plastic material. The H-shaped configuration of the body defines two pairs of leg portions 34 joined by a bridge portion 36. Each pair of leg portions 34 defines a holding portion of body 32 for receiving fiber optic connectors 12 on opposite sides of bridge portion 36 as seen in FIG. 1. The leg portions have laterally or transversely elongated apertures 38 for receiving projections 40 from housings 16 of connectors 12. For purposes described hereinafter, as shown in FIGS. 2, 3 and 4, a hole 42 extends completely through bridge portion 36 of the H-shaped body 32. Lastly, the inner distal edges of leg portions 34 are chamfered, as at 44, to facilitate inserting the connectors into opposite sides of the adapter assembly in the direction of arrow "B".

Referring to FIG. 3 in conjunction with FIGS. 1 and 2, a separate spring means in the form of a coil spring 46 is mounted on body 32 of adapter assembly 10 by locating the coil spring in through hole 42 in bridge portion 36 of the H-shaped body. In this manner, opposite ends of the coil spring are maintained in opposing biasing engagement with the fiber optic connectors as seen in FIG. 3. When in this assembled condition, the coil spring biases the connectors laterally outwardly in opposite directions and, thereby, biases projections 40 of the connector housings laterally outwardly against the outer edges of apertures 38 in leg portions 34 of the adapter body. This is effective to maintain the connectors in generally parallel relationship. In other words, while the body 32 of adapter assembly 10 maintains the connectors in a substantially side-by-side relationship, the spring means cooperates with the body to bias the connectors to a substantially parallel relationship, all of which is effective to facilitate insertion of the connectors into sockets 26 of duplex receptacle 14 (FIG. 1).

FIG. 4 shows a condition wherein the right-hand connector assembly 12 shown therein has been cocked for some reason, such as by a user engaging the connector initially with one of the sockets of the duplex receptacle in an out-of-alignment orientation. It can be seen that projections 40 and apertures 38 function as a sort of lost motion means mounting the fiber optic connectors in the adapter assembly to provide floating motion between the connectors and the assembly. It also can be seen how coil spring 46 yields to allow for this floating motion. The range of floating motion, of course, is limited to ensure that the connector assemblies can be inserted into the sockets of the duplex receptacle. Nevertheless, coil spring 46 continues to bias the connectors toward a substantially parallel relationship while H-shaped body 32 maintains the connectors in a substantially side-by-side relationship.

As stated above, FIGS. 5–8 show a second embodiment of the invention. This embodiment is substantially identical to the embodiment described above in relation to FIGS. 1–4, except for the form of the spring means of the adapter assembly and direction of the spring force. Therefore, like numerals have been applied in FIGS. 5–8 corresponding to like components described above in relation to FIG. 1–4.

More particularly, adapter assembly 10 in FIGS. 5–8 again include a generally H-shaped body, with the H-shaped configuration defining two opposing pairs of leg portions 34 joined by a bridge portion 36. Projections 40 project from housings 16 of fiber optic connectors 12 into apertures 38 in the leg portions of the H-shaped body. However, it should be noted in FIG. 5 that projections 40 are biased forwardly against edges 38a of apertures 38.

Figure 5:
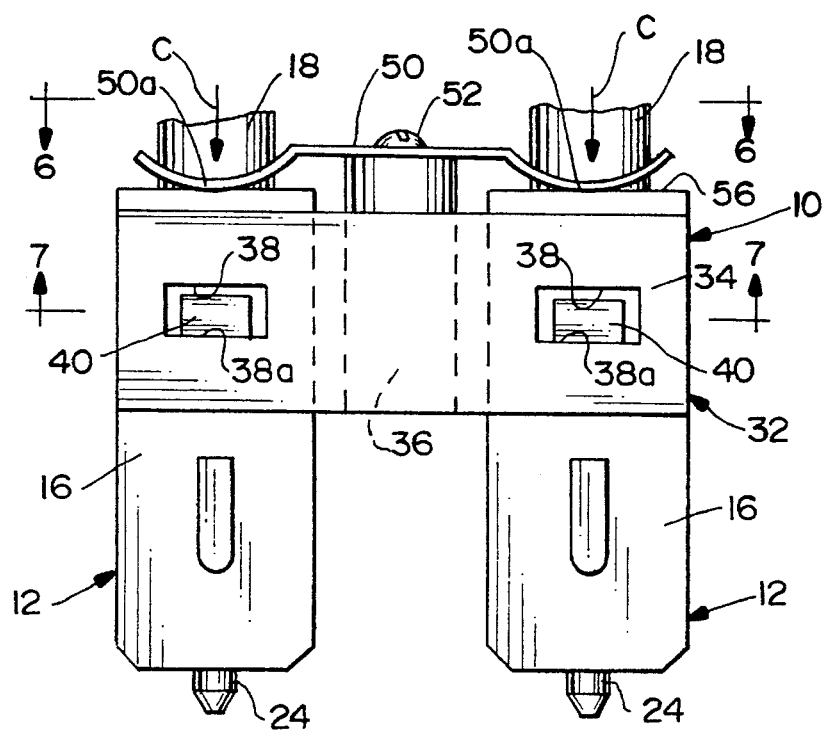
FIG. 5 is a top plan view of a second embodiment of an adapter assembly according to the invention.

In the embodiment of FIGS. 5–8, the separate spring means of the adapter assembly is provided by a leaf spring 50 secured by a fastening means 52, such as a bolt, to a post 54 which projects rearwardly from bridge portion 36 of the H-shaped body. The post may be molded integrally with the unitary body. Leaf spring 50 has bowed opposite ends 50a for applying biasing forces against rear faces 56 of connector housings 16 in the direction of arrows "C" (FIG. 5).

Figure 6:
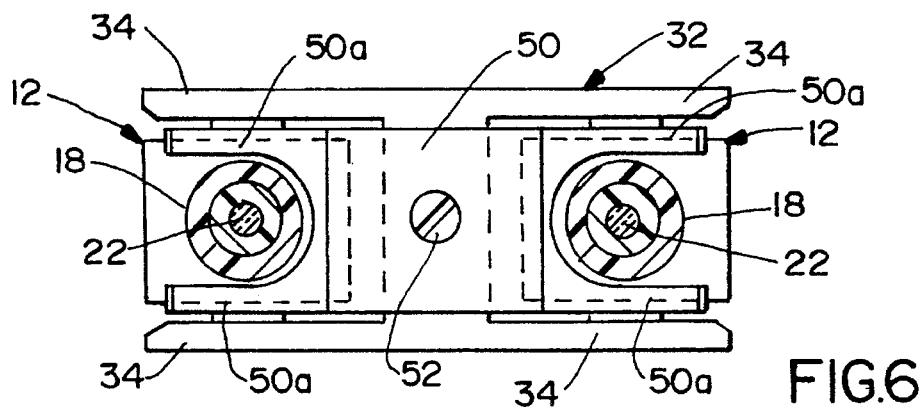
FIG. 6 is a vertical section taken generally along line 6—6 of FIG. 5.
Figure 7:
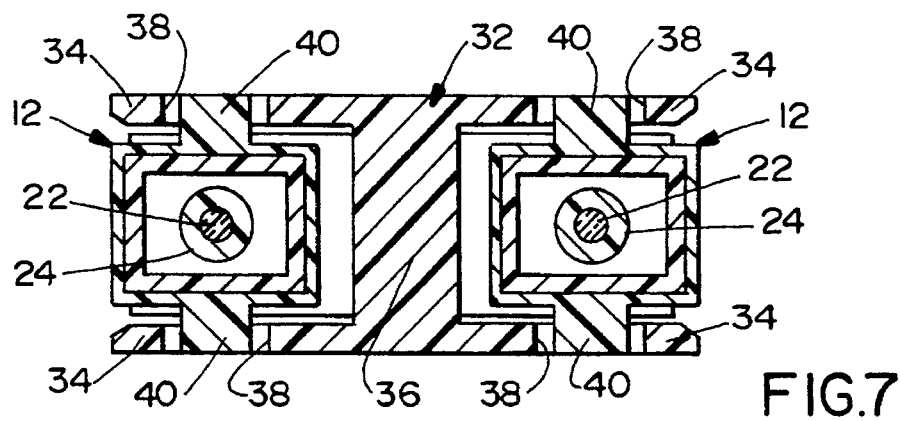
FIG. 7 is a vertical section taken generally along line 7—7 of FIG. 5.

In operation of the embodiment in FIGS. 5–8, when the assembly is in a static condition, opposite ends 50a of leaf spring 50 bias the fiber optic connectors forwardly such that projections 40 abut against front edges 38a of apertures 38. In this condition, the leaf spring is effective for maintaining the connectors in a substantially parallel relationship as seen in FIG. 5, while H-shaped body 32, again, maintains the connectors in a side-by-side relationship. FIGS. 6 and 7 show rear end and sectional views of this condition. However, it can be seen in FIG. 7 that apertures 38 are longer laterally than the width of projections 40 to allow for a lost motion type floating action between the connectors and the adapter body as described above in relation to the embodiment of FIGS. 1–4.

Figure 8:
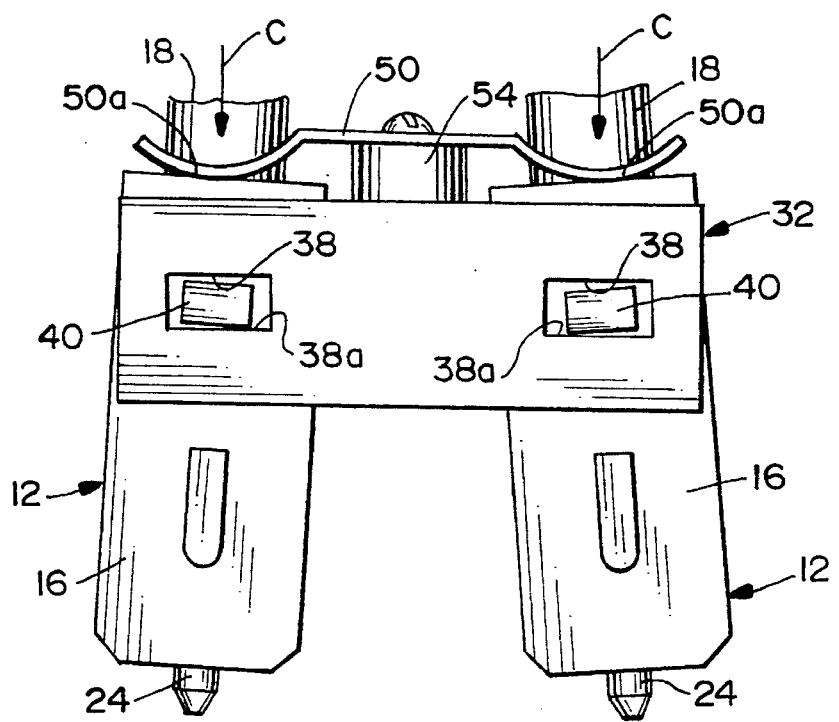
FIG. 8 is a top plan view similar to that of FIG. 5, but showing both fiber optic connectors out of alignment.

Lastly, FIG. 8 shows that fiber optic connectors 12 can become out-of-alignment due to the floating action allowed by the lost motion means of enlarging apertures 38 relative to projections 40. However, the distal ends 50a of leaf spring 50 provide a biasing action in the direction of arrows "C" which tend to force the connectors forwardly and force the projections against the forward edges 38a of projections 30 in an attempt to maintain the connectors in a substantially parallel relationship.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An adapter assembly for holding two individual fiber optic connectors in generally parallel side-by-side alignment, comprising:

a body having a pair of holding portions adapted for holding said fiber optic connectors in a substantially side-by-side relationship;

lost motion means mounting the fiber optic connectors to said holding portions to provide floating motion between the connectors and the body, said lost motion means including complementary interengaging abutment surfaces between the connectors and the body generally parallel to said parallel alignment direction; and a leaf spring mounted intermediate its ends to the body, with opposite ends of the leaf spring in biasing engagement with the fiber optic connectors to bias the fiber optic connectors to a substantially parallel relationship.

2. The adapter assembly of claim 1 wherein said lost motion means comprises enlarged apertures in the body receiving projections from the connectors, the apertures and projections defining said abutment surfaces.

3. The adapter assembly of claim 1 wherein said body is generally H-shaped with two opposing pairs of leg portions defining said pair of holding portions.

4. The adapter assembly of claim 3 wherein said pairs of leg portions are joined by a bridgeportion and said leaf spring is mounted intermediate its ends to the body near the bridge portion.

* * * * *